UNITED STATES PATENT OFFICE.

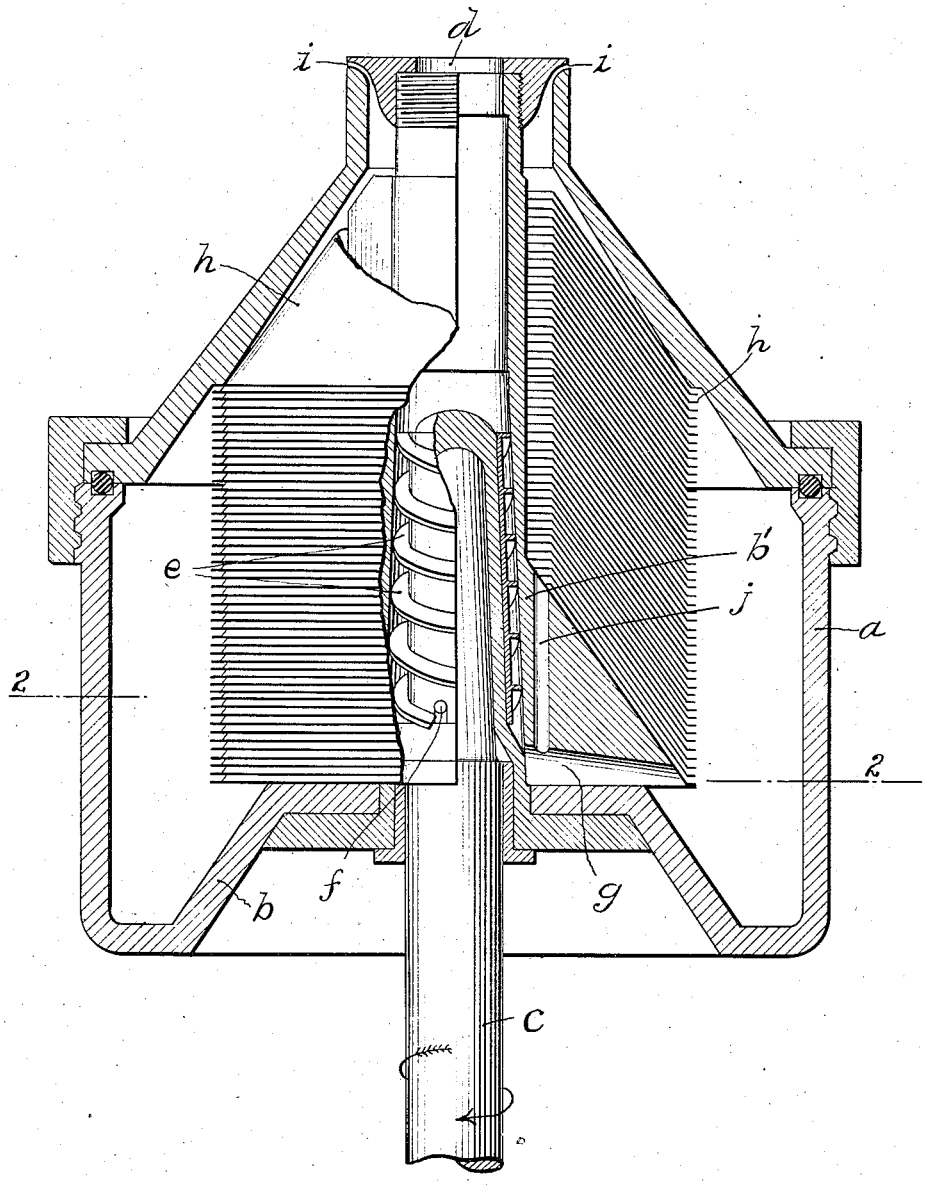

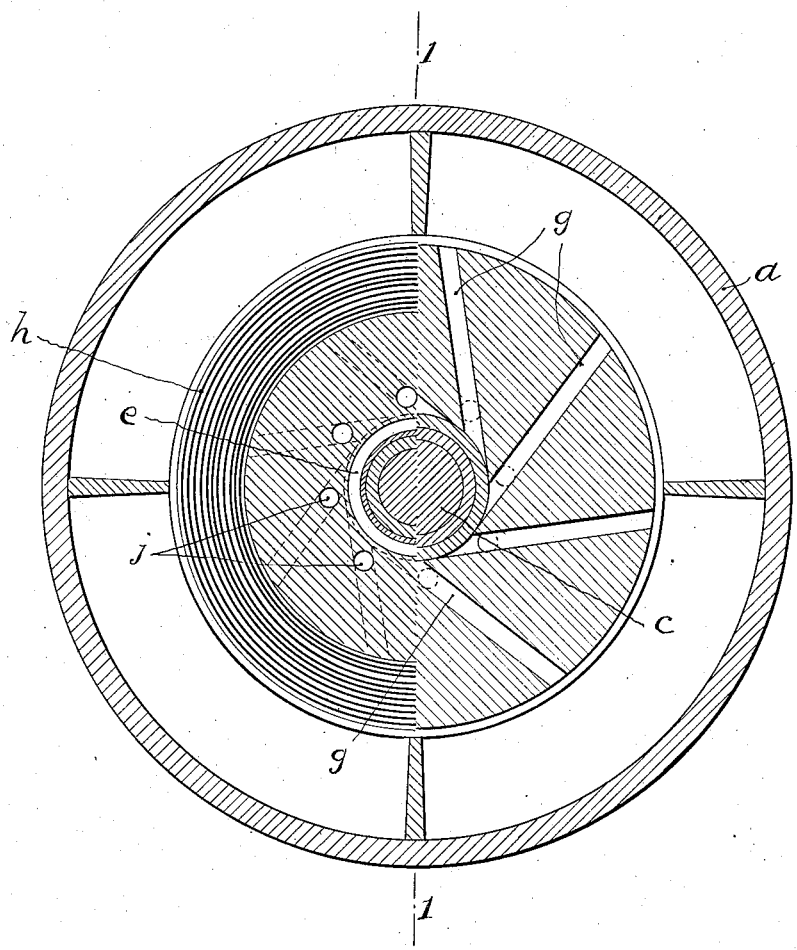

BERT ROBERT WRIGHT, OF POUGHKEEPSIE, NEW YORK, ASSIGNOR TO THE DE LAVAL SEPARATOR COMPANY, OF NEW YORK, N. Y., A CORPORATION OF NEW JERSEY.

CENTRIFUGAL LIQUID-MACHINE.

1,277,676.  Specification of Letters Patent.  Patented Sept. 3, 1918.

Original application filed October 12, 1911, Serial No. 654,222. Divided and this application filed December 15, 1913. Serial No. 806,793.

*To all whom it may concern:*

Be it known that I, BERT R. WRIGHT, a citizen of the United States, residing at and whose post-office address is Poughkeepsie, county of Dutchess, State of New York, have invented certain new and useful Improvements in Centrifugal Liquid-Machines; and I do hereby declare the following to be a full, clear and exact description of the invention, such as will enable others skilled in the art to which it appertains to make and use the same.

My invention relates to machines for centrifugalizing liquids. It embodies certain features of improvement, hereinafter described, which are applicable to such machines generally, but it is particularly appropriate to centrifugal machines for clarifying liquids,—especially for clarifying liquids comprising liquid constitutents of different specific gravities, as, for instance, milk.

In its general aspect, the centrifugal machine embodying my improvements comprises a bowl provided with means for rotating it about its axis, said bowl having a central receiving passage for the milk or other liquid to be centrifugalized. In this passage is placed a screw conveyer which greatly increases the amount of liquid which may be received into and pass through a bowl of a given size at a given speed of rotation. The liquid flows from the receiving passage through a transmitting passage or passages extending outwardly toward the periphery of the bowl.

Preferably, though not necessarily, the transmitting passage or passages are substantially tangential to the receiving passage from which they convey the liquid as the flow is facilitated by such a construction. So also, when the machine is to be used as a milk clarifier, the transmitting passage or passages are narrow or contracted, so that the velocity of the liquid will be sufficient to avoid clogging and to avoid separation of the liquid while passing therethrough.

Particularly, the transmitting passage or passages are provided intermediate of their length, with vents, for the escape of air or gases which would otherwise tend to retard the flow of the liquid therethrough. The bowl is preferably provided with a "liner" formed of superimposed inclined plates, and an ample clarifying space is provided between said liner and the periphery of the bowl, so as to provide for the removal of solid impurities without interfering with the passage of the liquid through the apparatus.

When the machine is used as a milk clarifier, the milk passes through the bowl without any substantial separation of the cream and milk, so that the resulting product of the operation is milk containing its normal content of butter-fat normally distributing therethrough. Any dirt, or other objectionable inherent or foreign substances which are commonly found in milk, are removed in the peripheral clarifying compartment, and the final product is practically devoid of solid impurities and other objectionable matter, and shows a substantial reduction in bacterial content and a diminished tendency to bacterial development, particularly of harmful character.

As a milk clarifier, therefore, the machine effects clarification of milk without separation of the lighter and the heavier fluid parts of the whole milk. In fact, the lighter and the heavier fluid parts of the whole milk always move in one direction, through the apparatus, whatever that direction may be, and are so controlled as to afford no opportunity for division or separation, while, at the same time, the whole milk is subjected to the maximum degree of centrifugal clarifying force.

In the accompanying drawings,—

Figure 1 represents a sectional view taken on the line 1—1 of Fig. 2, of a centrifugal machine embodying my invention.

Fig. 2 represents a section on the line 2—2 of Fig. 1.

Similar letters of reference indicate similar parts in both views.

Referring to the drawings, *a* is a bowl having a raised bottom *b* and hollow stem *b'*. *c* is the rotatory spindle, *d* the receiving passage, and *e* is a screw-conveyer secured to the hollow stem *b'* by a slot and pin connection *f*.

From the lower end of the receiving passage *d* extend the transmitting passages *g* which are preferably tangential. These transmitting passages *g* are restricted in area so as to afford sufficient velocity of the milk passing through them to avoid separation therein of the butter-fat globules from the other parts of the milk. This is of particular importance, inasmuch, as has been hereinbefore pointed out, one of the purposes of the machine, when used as a milk clarifier, is to avoid separation of the heavier and lighter liquid constituents of the milk and to deliver the milk from the bowl, in a clarified condition, and without any material change in the distribution of its liquid constituents; so that, when subsequently bottled, the cream will rise to the surface in the same manner as it does in the case of milk that has not been centrifugalized, that is to say, without showing a sharp and distinct line of separation between the cream layer and the main body portion of the milk below.

Within the bowl is contained the usual liner consisting of a series of frusto-conical plates $h$. $i$ is the discharge outlet, and $j$ is a vent or vents to allow the escape of air or gas from the passages $g$.

The liquid to be clarified and purified is fed into the receiving tube $d$, through which its passage is accelerated by the conveyer $e$. Thence it flows through the passages $g$ toward the periphery of the bowl and is subjected to the action of centrifugal force in the clarifying compartment of the bowl. The solid, heavier, foreign and objectionable matter is deposited on the peripheral wall of the bowl, and the clarified liquid passes in thin sheets between the plate $h$ and thence to the outlet $i$, from which it is discharged. The vents insure against interference of any entrained air or gases, with the intended operation of the apparatus and especially against clogging in the transmitting passages and undue retardation of the liquid therein.

The characteristic feature of the present application, in its relation to the general class of machines for centrifugalizing liquids, consists in the means described and claimed for facilitating the passage of the liquid through the bowl and particularly through the restricted passages leading from the central receiving tube or passage outwardly. In subserving this purpose, the screw-conveyer exercises a propelling function, and the venting of the air or gas removes a disturbing source of retardation and irregularity; for which reasons the means described are useful and applicable wherever their functions are similarly desirable in the centrifugalizing of liquids, whether or not the machine in which they are to be embodied serves likewise as a clarifier which avoids separation of liquid constituents of different specific gravities. The method of effecting clarification without separation is not dependent upon the use either of a screw-conveyer or of venting means for the transmitting passages leading toward the periphery of the bowl, and, although likewise carried out in the apparatus herein described when used as a milk clarifier, is claimed generically in my Patent No. 1,122,457, dated Dec. 29, 1914, together with the generic features of construction which are present in the apparatus for putting said method into practice.

Having thus described my invention what I claim is:

1. In a centrifugal liquid machine, in combination, a revoluble bowl, a receiving passage within the bowl, a stem within and spaced from the inner wall of the receiving passage, and a screw conveyer within the annular space between the stem and the receiving passage; substantially as described.

2. In a centrifugal liquid machine, in combination, a revoluble bowl, an upright reception tube arranged centrally of the bowl, a stem projecting upwardly within and spaced from the inner wall of the reception tube, a screw conveyer within the annular space between the stem and the reception tube, and a passage or passages leading from the reception tube to the interior of the bowl surrounding the reception tube; substantially as described.

3. In a centrifugal liquid machine, in combination, a revoluble bowl, a receiving passage within the bowl, and a conveyer within said passage to accelerate the reception of the liquid to be acted upon and its passage through the bowl, there being an air vent communicating with the receiving passage; substantially as described.

4. In a centrifugal liquid machine, in combination, a revoluble bowl, a receiving passage within the bowl, and a duct or ducts communicating with said receiving passage and lying within the radius of the discharge from the bowl to relieve the flow of the liquid being acted upon from resistance caused by accumulation of air or gas; substantially as described.

5. In a centrifugal liquid machine, in combination, a revoluble bowl provided with receiving and transmission passages for the liquid acted upon, and vents lying within the radius of the discharge from the bowl for the escape of air or gases tending to retard the flow of the liquid through said passages; substantially as described.

6. In a centrifugal liquid machine, in combination, a revoluble bowl provided with a receiving passage to receive the incoming liquid, a transmission passage or passages to convey the liquid into the interior of the bowl, and vents from the transmission passage or passages for the escape of air or gases tending to retard the flow of the liquid, said vents lying within the radius of the discharge from the bowl; substantially as described.

7. In a centrifugal liquid machine, in combination, a revoluble bowl, an upright reception tube arranged centrally of the bowl and provided with an enlarged lower end having transmission passages communicating at their inner ends with the reception tube and at their outer ends with the interior of the bowl, and ducts extending upward from said transmission passages through said enlarged end to relieve the flow of liquid being acted upon from resistance caused by accumulations of air or gas; substantially as described.

8. In a centrifugal liquid machine, in combination, a revoluble bowl, a receiving passage within the bowl, a conveyer within said passage to accelerate the reception of the liquid to be acted upon and its passage through the bowl, a contracted passage or passages extending tangentially from the receiving passage toward the periphery of the bowl, and means for relieving the liquid flow in said passage or passages from resistance of air or gas; substantially as described.

9. In a centrifugal liquid machine, in combination, a revoluble bowl having a bottom upraised in its central portion, a reception tube arranged centrally of the bowl and extending up from the upraised central portion of the bowl bottom, a hollow stem projecting upward within the lower part of the reception tube, and a screw conveyer secured to the outer wall of said stem, the enlarged lower part of the reception tube having passages connecting the reception tube with the interior of the bowl and vents extending upward from the passages; substantially as described.

In testimony whereof I affix my signature, in presence of two witnesses.

BERT ROBERT WRIGHT.

Witnesses:
  WM. A. HUBBARD,
  CHARLES L. POWELL.